J. S. JUAREZ.
RESILIENT TIRE.
APPLICATION FILED JAN. 6, 1915.

1,295,903.

Patented Mar. 4, 1919.
2 SHEETS—SHEET 1.

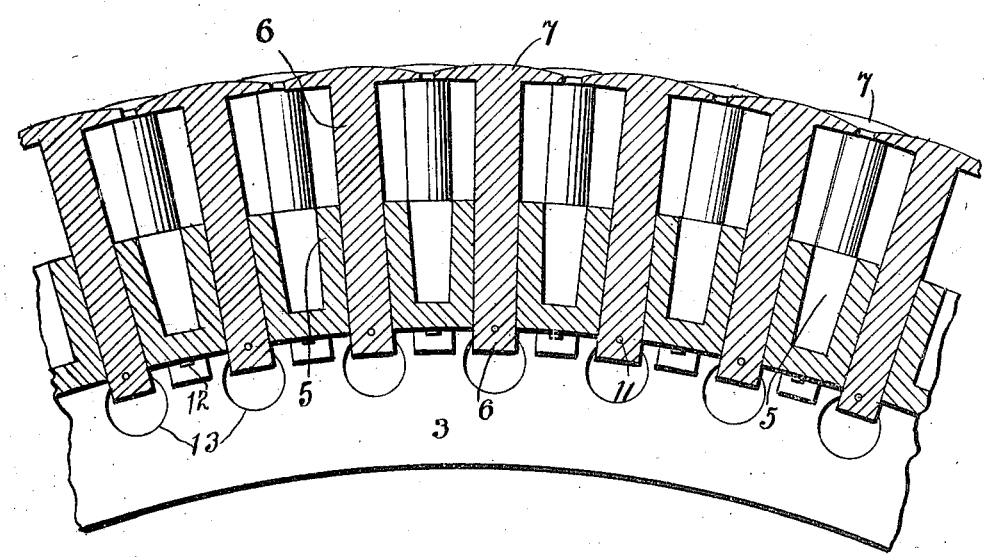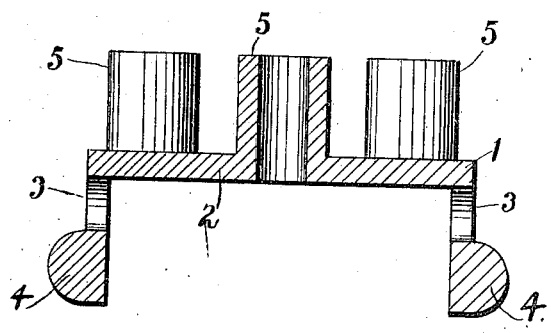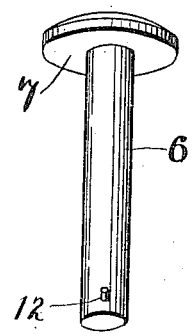

UNITED STATES PATENT OFFICE.

JOSÉ SANCHEZ JUAREZ, OF MEXICO, MEXICO.

RESILIENT TIRE.

1,295,903. Specification of Letters Patent. Patented Mar. 4, 1919.

Application filed January 6, 1915. Serial No. 780.

*To all whom it may concern:*

Be it known that I, JOSÉ SANCHEZ JUAREZ, a citizen of the United States of Mexico, residing at Mexico city, in the Distrito Federal and State of Mexico, have invented certain new and useful Improvements in Resilient Tires, of which the following is a specification.

This invention relates to improvements in tires for vehicle wheels or the like, and particularly to that type known as resilient tires and it is especially adapted for use on motor vehicles.

The primary object of the invention is to provide a resilient tire of the simplest structure, which dispenses entirely with the use of rubber thereby materially reducing the cost of manufacture of the same.

Referring to the drawings:—

Fig. 3 is a circumferential sectional view of a portion of the tire;

Fig. 4 is a detail sectional view of the rim or tire with the traction members removed therefrom; and Fig. 5 is a detail view in elevation of one of the traction members.

Referring now particularly to the drawings by corresponding characters of reference throughout the several views, the numeral 1 designates a rim which consists of a circular body 2 having depending side flanges 3 and circumferential beads 4, which can be omitted if desired.

Figure 1:
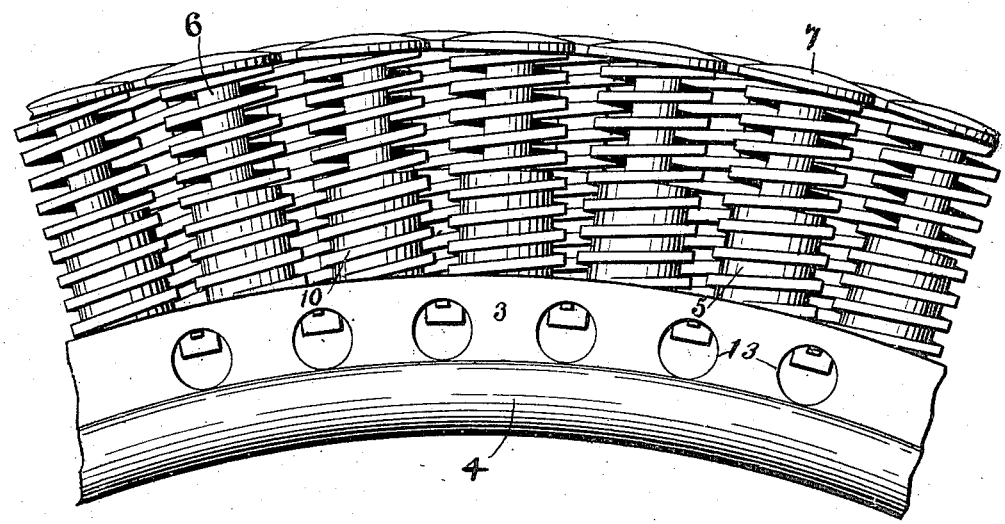
Figure 1 is a side elevation of a portion of the improved tire.
Figure 2:
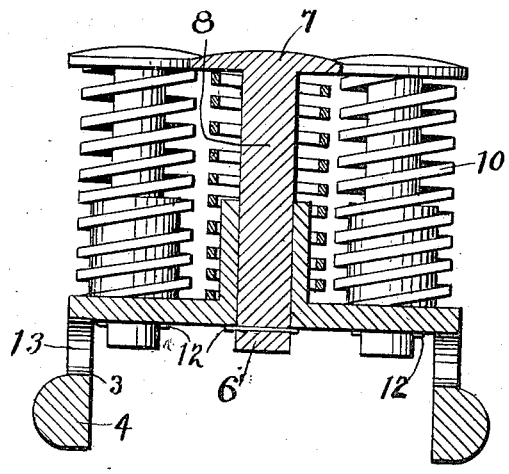
Fig. 2 is a cross sectional view taken through a portion of the tire.

Projecting from the body portion 2 of the rim or tire 1 is a plurality of guide extensions 5, each having a central passage therein extending through the body portion 1 as shown in Fig. 2. These guide extensions 5 are arranged in slanting relation to each other and radially with relation to the axis of the wheel to which the tire is to be attached.

Mounted in each of the guide extensions 5 is a sliding plunger 6, having a head 7 and a reduced portion 8 which is integral with the said head 7 and which projects from the under side thereof. The reduced portion or extension is round in cross section, and is of a size substantially equal to the size of the opening in each guide extension 5, and is adapted to be received therein as shown in Fig. 2.

Surrounding each of the guide extensions 5 is a coil spring 10 which comes in contact with the body portion 1 of the rim or tire at one end, and with the plunger at its opposite end. The lower end of each plunger 6 is made to receive a cotter pin 12 or other suitable fastening means for the purpose of preventing the said plungers from being forced out of their normal positions.

From the foregoing it will be seen that, in use, the load of the vehicle on which said tires are used, will be supported by the coil springs 10, which owing to the contact of the heads 7 of the plungers 6 with the roadway, and the sliding relation of the plungers 6 to the body of the rim or tire, are put in action when the heads 7 of the plungers 6 are brought in contact with said roadway. When, upon continued rotation of the wheel, the heads of the plungers 6 leave the roadway, the springs 10 operate to return the plungers 6 to normal position. The next successive plungers touching the roadway put their respective springs into action, thus providing for continual resilient support of the load.

The rim is provided with suitable openings 13 to permit of easy removal or substitution of the plungers and springs which detach the tires from the wheel.

What I claim is:—

A resilient tire comprising a circular body portion having inwardly directed side flanges, said circular body portion having openings formed therein, guides projecting from said openings, plungers slidable in the guides and having heads formed upon their outer ends, springs engaging the plungers for yieldingly forcing them in predetermined position, the inner ends of said plungers being disposed within said circular body portion, fastening means engaging the inner ends of said plungers, and the said flanges having openings therein affording access to the fastening means.

In testimony whereof I affix my signature in presence of two witnesses.

JOSÉ SANCHEZ JUAREZ.

Witnesses:
 ALONSO MARISCAL Y PIÑA,
 THOS. G. LEWIS.

Copies of this patent may be obtained for five cents each, by addressing the "Commissioner of Patents, Washington, D. C."